United States Patent [19]

Sasaki et al.

[11] 3,823,947

[45] July 16, 1974

[54] MAGNETIC RECORDING TAPE

[75] Inventors: Minoru Sasaki; Masana Uozumi, both of Ibaragi, Japan

[73] Assignee: Hitachi Maxell, Ltd., Ibaragi-shi, Osaka-fu, Japan

[22] Filed: Sept. 27, 1971

[21] Appl. No.: 183,795

[30] Foreign Application Priority Data

Sept. 25, 1970 Japan .............................. 45-95293

[52] U.S. Cl. ............. 274/11 E, 15/210 R, 161/116, 161/164, 179/100.2 A, 274/41.4

[51] Int. Cl. ............................................ G11b 25/06

[58] Field of Search ........... 161/100, 104, 108, 110, 161/116, 117, 118, 119, 120, 123, 124, 134, 126, 145; 274/11 E, 41.4, 43; 179/100.2 A, 100.2 R; 346/6.6 TP, 38 M; 15/210, 235; 242/74, 195

[56] References Cited

UNITED STATES PATENTS

| | | | |
|---|---|---|---|
| 2,606,409 | 8/1952 | Gordon | 15/210 R |
| 2,992,447 | 7/1961 | Hicks | 274/41.4 X |
| 3,069,815 | 12/1962 | Valentine | 179/100.2 A |
| 3,293,682 | 12/1966 | Giles | 179/100.2 A |
| 3,497,406 | 2/1970 | Skoog | 156/2 |

*Primary Examiner*—George F. Lesmes
*Assistant Examiner*—Paul Thibodeau
*Attorney, Agent, or Firm*—Craig & Antonelli

[57] ABSTRACT

A magnetic recording tape with a leader tape having one or both surfaces roughened so as to form small concave and convex portions therein. The leader tape is effective in removing the powder of the magnetic coating and dust from the capstan and the magnetic head of a magnetic recording and reproducing apparatus.

13 Claims, 3 Drawing Figures

MAGNETIC RECORDING TAPE

The present invention relates to a magnetic recording tape which is capable of cleaning a driven capstan and/or a magnetic head during the recording and reproduction operations of the magnetic tape.

A magnetic recording tape is pressed between and driven by a capstan and a pinch roller of the magnetic recording and reproducing apparatus, and has its magnetic layer brought into sliding contact with the magnetic head, whereby recording signals are recorded and reproduced. It is accordingly required that the capstan and the magnetic head be always kept clean; otherwise, powder from the magnetic coating and dust which adhere to the magnetic recording tape are gradually deposited and accumulated on the capstan and the magnetic head to render the traveling of the magnetic recording tape and operation of the magnetic head abnormal. As the result, wow and flutter occur, and the signal-to-noise ratio and the frequency characteristics of the apparatus are deteriorated.

For removing powder derived from the magnetic coating and dust from the capstan and the magnetic head, it has been proposed to affix or form a cloth surface of planted hairs on a leader tape which is connected to an end of a magnetic recording tape, and to bring the leader tape into sliding contact with the capstan and magnetic head at the beginning and/or end of the recording or reproduction. Since the cloth surface of planted hairs is pliable, it may remove any powder or dust without grinding and damaging the capstan and the magnetic head. However, even in the case where the adhesive force of the planted hairs formed on the base of the leader tape is large, they tend to fall off from the base as the number of times of the sliding contact is increased, so that their function or performance is lowered rapidly with repeated use. Therewith, the hair-shaped bodies which have fallen off adhere to the magnetic recording tape and, under the conditions in which they are wound and accumulated, their traces are formed on the magnetic recording tape with the result that drop-out and sound skip are caused. In addition, the magnetic recording tape is usually stored, except for special uses, in a wound manner and accumulated on a reel-shaped body. Hence, a considerably large pressing force is always exerted upon the leader tape wound at the lowermost layer with the result that the cloth surface of planted hairs is pressed flat and deformed under the pressing force, thereby to largely reduce the effectiveness of the cleaning action.

According to the present invention, extremely small concave and convex portions are formed in one or both surfaces of a leader tape, for instance, by subjecting the same to a sand blast process or chemical etching process so that the surface or surfaces are made rough.

Since the convex portions having a function similar to the planted hairs are integral with the base film, they do not fall off even under their intense sliding contact action with the magnetic head and the capstan. Unlike the planted hairs, the bases of the convex portions have large areas, and they are never bent, laid down and deformed even when the leader tape is wound and accumulated on the magnetic recording tape. Thus, the leader tape has excellent mechanical strength.

In a magnetic recording tape, the leader tape is usually provided at one or both ends of the magnetic recording tape but may be provided at any intermediary portion.

Making reference to the accompanying drawings, the present invention will be hereinafter described in greater detail in conjunction with the accompanying drawing wherein.

Figure 1:
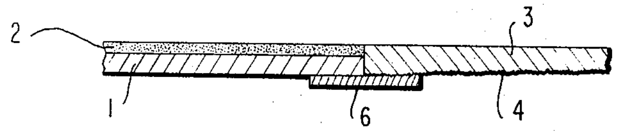
FIG. 1 is a sectional view of an end part of a magnetic recording tape according to the present invention.

In FIG. 1 a leader tape 3 with one surface 4 roughened by a sand blast process, for example, is connected to a magnetic tape 1 so that the roughened surface is located on the major face of the leader opposite to the magnetic layer 2. The embodiment is adapted to clean a capstan when loaded into a cartridge, as shown in FIG. 2.

Figure 2:
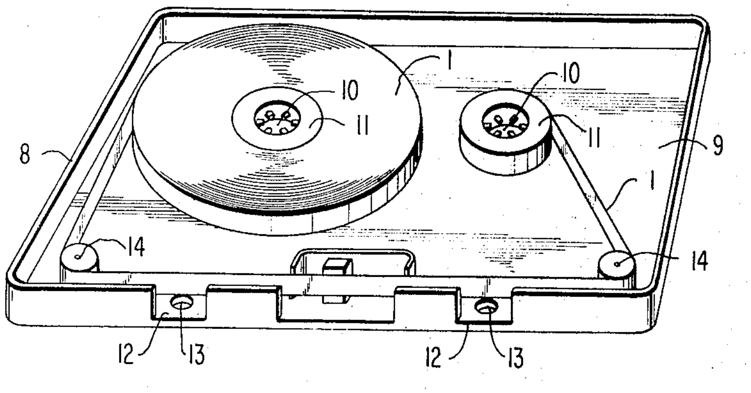
FIG. 2 is a perspective view of a magnetic tape cartridge receiving therein a magnetic recording tape of the invention, an upper case of the cartridge being removed.
Figure 3:
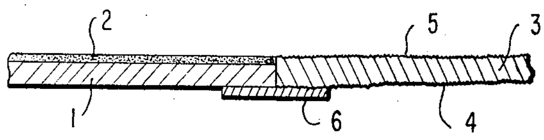
FIG. 3 is a sectional view of an end part of the magnetic recording tape received in the cartridge as shown in FIG. 2.

In FIG. 3 the leader tape 3 with both surfaces 4 and 5 roughened is connected to the magnetic recording tape 1. This embodiment is adapted to clean both the capstan and the magnetic head when loaded into a cartridge, as shown in FIG. 2.

These leader tapes are greatly effective when made of a relatively hard film (e.g., polyester), but are still effective when made of a soft film (e.g., plasticized polyvinyl chloride).

As previously described, FIG. 2 illustrates the magnetic recording tape cartridge loaded with the magnetic recording tape of the invention. The cartridge 8 consists of a lower case 9 and an upper case (not shown). The case 9 has two through-holes 10, in which spools 11 engaging end parts of the magnetic recording tape 1 are placed. The magnetic recording tape 1 is guided to the front of the case 9 by guide rollers 14 and travels in such way that it is pressed between and driven by pinch rollers and capstans being respectively inserted through pinch roller insertion openings 12 and capstan insertion openings 13. When the magnetic recording tape 1 travels under such a state, the capstan and/or the magnetic head are brought into sliding contact with the leader tape 3 at the beginning and/or completion of the recording or reproduction.

Therefore, the capstan, or the magnetic head, is always kept clean with the result that the undesirable phenomena caused by the abnormal traveling of the magnetic tape, such as wow and flutter, or the deterioration in the signal-to-noise ratio and the frequency characteristics as are caused by the adherence of powder from the magnetic layer and dust to the head to alter the clearance of the magnetic head are prevented. Moreover, with the leader tape of the invention, gradual build-up of dust and/or powder from the magnetic layer as occurs with time in the case of use of the cloth surface of planted hairs is lessened, and additionally, the leader is kept clean itself so that a good cleaning action is always ensured.

While in the embodiments as shown in FIGS. 1 and 3 the leader tape with one or both surfaces roughened is connected to the magnetic recording tape 1 by an adhesive tape 6, the base film of the magnetic recording tape which is previously roughened and with an end part not formed with the magnetic layer may also be used as the leader tape. This measure is effective in that the adhesive force between the base film and the magnetic layer 2 of the magnetic recording tape 1 may also be improved. SImilarly, the adhesive force may be far improved over the prior art also in the connecting method for the leader tape as illustrated in FIGS. 1 and 3, and such attendant effect is obtained that the disengagement of the leader tape from the magnetic recording tape does not occur.

What is claimed is:

1. The combination of a magnetic recording tape and a leader tape wherein said magnetic recording tape includes a base film strip having a layer of magnetic material disposed on one major surface thereof, said leader tape being secured to or integral with said base film strip and having a chemically etched or sand blasted roughened surface so as to form small concave and convex portions on at least one major surface thereof.

2. The combination defined in claim 1 wherein both surfaces of said leader tape are roughened so as to have small convex and concave portions.

3. The combination defined in claim 1 wherein the magnetic recording tape includes a base film strip and a layer of magnetic material disposed on one surface of the base film strip, said leader tape being secured to said base film strip with the roughened surface thereof on the opposite side from said layer of magnetic material.

4. The combination defined in claim 1 wherein said magnetic recording tape includes a base film strip and a layer of magnetic material disposed on one surface thereof, said leader tape being formed integral with said base film strip.

5. The combination defined in claim 1, wherein the leader is secured to the magnetic recording tape by an adhesive tape.

6. The combination defined in claim 1, wherein the roughened surface is a sand-blasted surface.

7. The combination defined in claim 1, wherein the roughened surface is a chemically etched surface.

8. The combination defined in claim 1, wherein the leader tape is made of a polyester.

9. The combination defined in claim 1, wherein the leader tape is made of plasticized polyvinyl chloride.

10. The combination defined in claim 8, wherein the surface of the polyester has been roughened by sand blasting.

11. The combination as defined in claim 1, wherein the surface of the polyester has been roughened by chemical etching.

12. The combination defined in claim 1, wherein the concave and convex portions are homogeneous with the leader.

13. The combination of a magnetic recording tape including a base film strip having a layer of magnetic material disposed on one major surface thereof and a second tape having at least one chemically etched or sand blasted roughened surface so as to have small concave and convex portions on at least one major surface thereof, said second tape being secured to or integral with said base film strip in an intermediary portion of said magnetic recording tape.

* * * * *